ical activity is desired. The 17α-
United States Patent Office 2,813,880
Patented Nov. 19, 1957

2,813,880

4,4-DIALKYL ANDROSTENES AND METHOD

J Allan Campbell, Kalamazoo Township, Kalamazoo County, and John C. Babcock, Portage Township, Kalamazoo County, Mich., assignors to The Upjohn Company, Kalamazoo, Mich., a corporation of Michigan No Drawing. Application June 14, 1956,
Serial No. 591,304

21 Claims. (Cl. 260—397.4)

This invention relates to novel steroid compounds and is more particularly concerned with 3-keto-4,4-dialkyl-17-oxygenated-$\Delta^5$-androstene and 3-keto-4,4-dialkyl-17-oxygenated-$\Delta^5$-estrene compounds and a process of production thereof.

The novel compound and the process of production thereof can be represented by the following formulae:

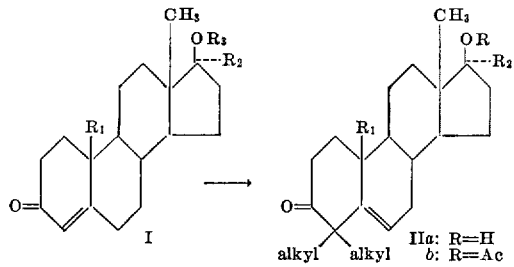

wherein R₁ is selected from the group consisting of hydrogen and methyl, R₂ is selected from the group consisting of hydrogen, methyl, ethyl, propyl, and vinyl, R and R₃ are selected from the group consisting of hydrogen and an acyl group of an organic carboxylic acid, preferably a hydrocarbon carboxylic acid containing from one to eight carbon atoms, inclusive, and wherein the alkyl groups contain between one and four carbon atoms, inclusive.

The process of the present invention comprises treating a selected 3-keto-17-oxygenated-4-androstene or 4-estrene of Formula I with an alkyl halide wherein the halogen is of atomic number 17 to 53, inclusive, preferably alkyl bromide or iodide, in a strongly basic solution such as potassium tertiary butoxide to obtain the corresponding 3-keto-17β-hydroxy-4,4-dialkyl-5-androstene or 3-keto-17β-hydroxy-4,4-dialkyl-5-estrene of Formula IIa. Esterification of the 4,4-dialkyl steroids thus obtained with acid halides and anhydrides yields the corresponding 17-esters of Formula IIb.

The term 17-oxygenated, as has been illustrated by the above formulae, refers to those androstene and estrene compounds having a 17β-hydroxy or 17β-acyloxy group wherein the acyl radical is of an organic carboxylic acid, preferably a hydrocarbon carboxylic acid containing from one to eight carbon atoms, inclusive.

It is an object of the instant invention to produce 3-keto-4,4-dialkyl-17-oxygenated-$\Delta^5$-androstene and 3-keto-4,4-dialkyl-17-oxygenated-$\Delta^5$-estrene compounds. It is a particular object of the instant invention to produce 3-keto-4,4-dimethyl-17-hydroxy-5-androstene-3-one and 3-keto-4,4-dimethyl-17-hydroxy-5-estrene-3-one, the ester thereof and the 17α-methyl derivatives thereof. It is another object of the instant invention to provide a process for the production of such 4,4-diakylated-17-oxygenated-$\Delta^5$-androstenes and 4,4-dialkylated-17-oxygenated-$\Delta^5$-estrene compounds. Other objects will be apparent to those skilled in the art to which this invention pertains.

The instant 3-keto-4,4-dialkyl-17-hydroxy-5-androstenes and 3-keto-4,4-dialkyl-17-oxygenated-5-estrene compounds are useful as anabolic agents. They can be given parenterally or perorally wherever an increase in anabolic activity is desired. The 17α-alkylated especially the 17α-methyl derivatives are particularly useful in oral administration. The compounds have furthermore the advantage that they have little sex hormonal (i. e., androgenic or estrogenic) activity and can be used in anti-androgenic therapy, e. g., during puberty, in certain mental diseases, and the like, as oil-soluble injectables. The compounds have also anti-hypertensive cardiac regulatory activity and are potentiating agents orally with methyl testosterone or Evipal sodium (Hexobarbital sodium) for deeper intravenously-produced anesthesia. The compounds furthermore have antifungal (yeast) and antibacterial activity, especially against *Staphylococcus aureus, S. albus, S. fecalis, S. bacillus, S. subtilis, Escherichia coli, Salmonella typhosa*, or the like, and are useful as intravenously-injectable compounds in systemic mycoses both against fungi (yeasts) as well as secondary bacterial infections. In addition, the compounds of the instant invention are intermediates in the production of other important and active 3-keto-4,4-dialkyl-$\Delta^5$-steroids.

The starting compounds of the instant invention are known compounds, such as testosterone, methylestosterone, ethyl- and vinyltestosterone [Hershberg et al., J. Am. Chem. Soc. 73, 5073 (1951)], propyltestosterone (Preparation 3), nortestosterone, methylnortestosterone, ethyl- and propylnortesosterone (Colton, U. S. 2,721,871), and the like. Esters of these compounds may also be used, wherever available, however, it should be realized that in the first step of the process due to the basic medium necessary, the alkylation proceeds with simultaneous hydrolysis of the ester group.

In carrying out the process of the instant invention the selected testosterone is dissolved in an organic solvent such as, for example, tertiary butyl alcohol, tertiary amyl alcohol, methanol, ethanol, propanol, dioxane, or the like, and thereto is added a strongly basic solution. As a base, alkali metal alkoxides such as potassium tertiary butoxide, potassium tertiary amyloxide, sodium or potassium methoxides or ethoxides, sodium, potassium or lithium amide, or concentrated solutions of sodium or potassium hydroxide in alcohol are usable, with sodium or potassium tertiary butoxide or tertiary amyloxide preferred. To this solution is added the alkylating agent slowly and/or under cooling so as to avoid a rising temperature. Addition of the alkylating agent at lower temperatures is preferred in order to avoid side reactions. Commonly used alkylating agents in this reaction are methyl, ethyl, propyl, isopropyl, butyl, isobutyl, and allyl iodides and bromides, and less preferred but still operative, the chlorides. While two moles of alkyl halides are necessary for each mole of steroid, it is preferred to use an excess of the alkyl halides such as two to five times the amount stoichiometrically necessary. Larger proportions of alkyl halides are also operative without additional advantages. After the addition has been completed, the reaction mixture is stirred at room temperature (from fifteen to thirty degrees centigrade) for a period of several hours. Periods from one to 24 hours are generally employed but shorter or longer periods are also operative. The thus obtained 4,4-dialkyl-$\Delta^5$-steroid is recovered from the reaction mixture by conventional procedures by precipitation with water or by extraction of the reaction mixture diluted with excess of water. Organic solvents useful for the extraction of the water-diluted reaction mixture comprise the water-immiscible solvents, such as methylene chloride, chloroform, carbon tetrachloride, ethylene dichloride, ether, ethyl acetate, benzene, toluene, hexanes or heptanes, or the like. Evaporation of the solvents of the separated organic layers yields the crude product which is purified by conventional procedures such as recrystallization or chromatography, as deemed necessary.

The thus obtained product of the general Formula IIa, a 4,4-dimethyl-17β-hydroxy-5-androsten-3-one or 4,4-dialkyl-17β-hydroxy-5-estren-3-one, can be esterified in the usual manner, that is, by treating the steroid with an acid halide or acid anhydride in pyridine solution. If the steroid has a 17α-alkyl group, esterification is usually carried out by heating the steroid near the boiling point with an anhydride of a hydrocarbon carboxylic acid or by heating the steroid together with the halide of a hydrocarbon carboxylic acid and submitting the resulting mixture containing 17β-esters and 3-enol, 17β-diesters to partial hydrolysis in an acidic medium to obtain the ester of the tertiary alcohol.

The following examples are illustrative of the process and products of the present invention, but are not to be construed as limiting.

PREPARATION 1.—17α-ETHYLTESTOSTERONE 17β-PROPIONATE

A solution of 0.5 gram of 17α-ethyltestosterone in four milliliters of propionic anhydride was heated on the water-bath for a period of four hours. Thereafter the reaction mixture was poured into thirty milliliters of ice water, neutralized with sodium bicarbonate and filtered. The precipitate was collected on filter paper, washed repeatedly with water and then recrystallized from ethanol and Skellysolve B hexanes to give pure 17α-ethyltestosterone 17β-propionate.

In the same manner heating other 17α-alkyltestosterones and 17α-alkylnortestosterones with acid anhydrides, which are liquids at room temperature (at twenty to thirty degrees centigrade), to temperatures between sixty degrees centigrade and the reflux temperature of the acid anhydride produces the corresponding 17α-alkyltestosterone and 17α-alkylnortestosterone 17β-acylates such as the acetate, propionate, butyrate, isobutyrate, valerate, isovalerate, hexanoate, and the like, wherein the alkyl groups are methyl, ethyl, propyl, vinyl, and butyl, or the like.

PREPARATION 2.—17α-PROPYLNORTESTOSTERONE 17β-BENZOATE

A solution of 0.5 gram of 17α-propylnortestosterone (Colton, U. S. 2,721,871) of melting point 120–122 degrees centigrade in benzoyl chloride was heated for six hours on the water-bath. The resulting reaction mixture containing 17α-propylnortestosterone 17β-benzoate (17β-benzoyl-17α-propyl-4-estrene-3-one) and 3,17β-dibenzoyl-17α-propyl-3,5-estradiene was poured into a solution containing fifty milliliters of water, fifty milliliters of ethanol and one milliliter of sulfuric acid. The thus-obtained aqueous reaction mixture was allowed to stand at room temperature for six hours to produce hydrolysis of the enol ester, neutralized, and extracted with methylene chloride. The methylene chloride extracts were washed repeatedly with water, dried over anhydrous sodium sulfate and evaporated to give a residue of crude 17α-propylnortestosterone 17β-benzoate, which was purified by recrystallization from methanol.

In the same manner given in Preparation 2, 17α-alkyltestosterones and 17α-alkylnortestosterone acylates are prepared by heating the 17α-alkyltestosterones or 17α-alkylnortestosterones, respectively, with a halide of a hydrocarbon carboxylic acid and hydrolyzing the resulting enol acylate in the reaction mixture with dilute alcoholic aqueous acid solutions. In this manner the 17β-valerate, hexanoate, heptanoate, octanoate, β-cyclopentylpropionate, benzoate, phenylacetate, phenylpropionate, anisate, toluate, trimethylacetate, fluoroacetate, chloroacetate, bromoacetate, iodoacetate, trichloro- and trifluoroacetate, or the like, of 17α-alkyltestosterone and 17α-alkylnortestosterone wherein the alkyl group is, for example, methyl, ethyl, propyl, butyl, vinyl, propargyl, or the like, can be prepared.

PREPARATION 3.—17α-PROPYLTESTOSTERONE

A mixture of 0.3 gram of 3β,17β-dihydroxy-17α-propyl-5-androstene [Greenhalgh et al., J. Chem. Soc. 1190 (1951)], twelve milliliters of pure dry acetone and 1.1 grams of aluminum tertiary butoxide in 22 milliliters of dry benzene was heated under reflux for six hours. The resulting mixture poured into water, neutralized with dilute hydrochloric acid and extracted with ether. The ether extracts were washed with water, dried with anhydrous sodium sulfate, evaporated to dryness and the resulting residue redissolved in benzene and chromatographed over alumina. Ether was used to develop the column. The fractions containing the 17α-propyltestosterone were evaporated and the resulting crude product recrystallized twice from methanol to give pure 17α-propyltestosterone.

Example 1.—4,4-dimethyl-17β-hydroxy-5-androsten-3-one

A solution of potassium tertiary butoxide was prepared by dissolving 1.4 grams of potassium metal in thirty milliliters of tertiary butyl alcohol. To this solution was added 2.88 grams of testosterone (0.01 mole) in thirty milliliters of tertiary butyl alcohol. The solution was cooled to a temperature of between five to ten degrees centigrade and thereto was added 8.5 grams (0.06 mole) of methyl iodide. The mixture thereupon was stirred for a period of sixteen hours at room temperature (about twenty to 25 degrees centigrade). To this mixture was added 300 milliliters of a water and ice mixture and then the aqueous solution was extracted with three 100-milliliter portions of methylene chloride. The organic layer was separated, washed with sodium bicarbonate and water, dried over anhydrous sodium sulfate and evaporated. The thus obtained residue was triturated with methanol and the insoluble portion was recrystallized from methanol. The thus obtained 4,4-dimethyl-17β-hydroxy-5-androsten-3-one had a melting point of 195 to 200 degrees centigrade, rotation $[\alpha]_D$ minus sixteen degrees (in chloroform).

Analysis.—Calcd. for $C_{21}H_{32}O_2$: C, 79.67; H, 10.19. Found: C, 79.56; H, 10.11.

Example 2.—4,4-diethyl-17β-hydroxy-5-androsten-3-one

In the same manner as shown in Example 1, a solution of testosterone propionate in isopropyl alcohol was added to a solution of excess sodium tertiary butoxide in tertiary butyl alcohol and to the cooled mixture was added an excess of ethyl bromide. The mixture was stirred for a period of six hours and thereafter poured into water and extracted with chloroform. The chloroform extract was separated, washed with sodium bicarbonate, thereupon washed with water, dried over anhydrous sodium sulfate, and evaporated to give a residue of 4,4-diethyl-17β-hydroxy-5-androsten-3-one. Recrystallization from ethanol gave pure 4,4-diethyl-17β-hydroxy-5-androsten-3-one.

Example 3.—4,4-diisopropyl-17β-hydroxy-5-androsten-3-one

In the same manner as given in Example 1, a solution of potassium tertiary butoxide and testosterone propionate in tertiary butyl alcohol was admixed under cooling with isopropyl iodide. The mixture was stirred for a period of eighteen hours and thereupon poured into excess of water and extracted. The extracts were washed with brine solution and water, dried over anhydrous sodium sulfate and evaporated to give 4,4-diisopropyl-17β-hydroxy-5-androsten-3-one.

Example 4

In the same manner as given in Example 1 reacting a solution of:

(a) testosterone β-cyclopentylpropionate in tertiary butyl alcohol, in the presence of potassium tertiary butoxide with propyl iodide yielded 4,4-dipropyl-17β-hydroxy-5-androsten-3-one;

(b) testosterone phenylacetate in tertiary butyl alcohol, in the presence of potassium tertiary butoxide with allyl bromide yielded 4,4-diallyl-17β-hydroxy-5-androsten-3-one;

(c) testosterone butyrate in tertiary butyl alcohol, in the presence of potassium tertiary butoxide with methyl iodide yielded 4,4-dimethyl-17β-hydroxy-5-androsten-3-one;

(d) testosterone valerate in tertiary butyl alcohol, in the presence of potassium tertiary butoxide with ethyl iodide yielded 4,4-diethyl-17β-hydroxy-5-androsten-3-one; and (e) testosterone hexanoate in tertiary butyl alcohol, in the presence of potassium tertiary butoxide with propyl iodide yielded 4,4-dipropyl-17β-hydroxy-5-androsten-3-one.

In the same manner as given in Examples 1 through 4, 4,4-dialkyl-17β-hydroxy-5-androsten-3-ones wherein the alkyl group is methyl, ethyl, propyl, isopropyl, butyl, isobutyl, or allyl may be prepared by reacting testosterone or a hydrocarbon carboxylic acid ester of testosterone such as the acetate, propionate, butyrate, isobutyrate, valerate, isovalerate, hexanoate, heptanoate, octanoate, benzoate, phenylacetate, toluate, salicylate, hemitartrate, hemimaleate, hemisuccinate, or the like, with alkyl iodide, alkyl bromide, or alkyl chloride in a highly basic solution such as sodium ethoxide, sodium methoxide, potassium tertiary butoxide, potassium tertiary amyl oxide, or the like.

Example 5.—4,4-dimethyl-17β-hydroxy-5-estren-3-one

In the same manner as given in Example 1, nortestosterone (17β-hydroxy-4-estren-3-one) was dissolved in potassium tertiary butoxide and tertiary butyl alcohol. To the cooled solution was added an excess of methyl iodide and the mixture was stirred for a period of two hours. The mixture was thereupon poured into excess of water and extracted with methylene chloride. The extracts were washed, dried, evaporated, and the material thus obtained recrystallized from methanol to give pure 4,4-dimethyl-17β-hydroxy-5-estren-3-one of melting point 135 to 137 degrees centigrade and rotation $[\alpha]_D$ plus five degrees (chloroform).

Anal.—Calcd. for $C_{20}H_{30}O_2$: C, 79.42; H, 10.00. Found: C, 79.60; H, 10.34.

Example 6.—4,4-diethyl-17β-hydroxy-5-estren-3-one

In the same manner as shown in Example 1, nortestosterone acetate was reacted in tertiary butyl alcohol solution in the presence of potassium tertiary amyl oxide with ethyl iodide to give 4,4-diethyl-17β-hydroxy-5-estren-3-one.

Example 7.—4,4-diisobutyl-17β-hydroxy-5-estren-3-one

In the same manner as given in Example 1, nortestosterone propionate, dissolved in tertiary butyl alcohol, in the presence of potassium tertiary butoxide was reacted with isobutyl iodide to give 4,4-diisobutyl-17β-hydroxy-5-estren-3-one.

Example 8.—4,4-dipropyl-17β-hydroxy-5-estren-3-one

In the same manner as given in Example 1, reacting a solution of nortestosterone β-cyclopentylpropionate, dissolved in tertiary butyl alcohol, in the presence of potassium tertiary butoxide with propyl iodide yielded 4,4-dipropyl-17β-hydroxy-5-estren-3-one.

Example 9.—4,4,17α-trimethyl-17β-hydroxy-5-estren-3-one

In the same manner as given in Example 1, 17α-methyl-17β-hydroxy-4-estren-3-one (methylnortestosterone), dissolved in tertiary butyl alcohol was reacted in the presence of potassium tertiary butoxide with excess of methyl iodide to give 4,4,17α-trimethyl-17β-hydroxy-5-estren-3-one.

Example 10.—4,4-dimethyl-17α-ethyl-17β-hydroxy-5-estren-3-one

In the same manner as given in Example 1, 17α-ethyl-17β-hydroxy-4-estren-3-one, dissolved in ethanol, in the presence of sodium methoxide was reacted with methyl bromide to give 4,4-dimethyl-17α-ethyl-17β-hydroxy-5-estren-3-one.

Example 11.—4,4,17α-triethyl-17β-hydroxy-5-androsten-3-one

In the same manner as given in Example 1, ethyltestosterone, dissolved in tertiary butyl alcohol, in the presence of potassium tertiary butoxide was reacted with ethyl iodide in excess to give 4,4,17α-triethyl-17β-hydroxy-5-androsten-3-one.

Example 12.—4,4,17α-tripropyl-17β-hydroxy-5-androsten-3-one

In the same manner given in Example 1, 17α-propyltestosterone, dissolved in tertiary butyl alcohol, in the presence of potassium tertiary butoxide was reacted with propyl iodide to give 4,4,17α-tripropyl-17β-hydroxy-5-androsten-3-one.

Example 13.—4,4-dibutyl-17α-methyl-17β-hydroxy-5-androsten-3-one

In the same manner given in Example 1, methyltestosterone, dissolved in tertiary butyl alcohol, in the presence of potassium tertiary butoxide was reacted with butyl bromide to give 4,4-dibutyl-17α-methyl-17β-hydroxy-5-androsten-3-one.

Example 14

In the same manner given in Example 1, reacting a solution of:

(a) 17α-methyltestosterone acetate [S. A. Julia et al., Helv. Chimica Acta 35, 2080 (1952)] in tertiary butyl alcohol, in the presence of potassium tertiary butoxide with methyl iodide yielded 4,4,17α-trimethyl-17β-hydroxy-5-androsten-3-one of melting point 189–194 degrees centigrade and rotation $[\alpha]_D$ minus 35 degrees [in methyl alcohol];

(b) 17α-ethyltestosterone propionate in tertiary butyl alcohol in the presence of potassium tertiary butoxide with ethyl iodide yielded 4,4,17α-triethyl-17β-hydroxy-5-androsten-3-one;

(c) 17α-propyltestosterone benzoate in tertiary butyl alcohol in the presence of potassium tertiary butoxide with propyl iodide yielded 4,4,17α-tripropyl-17β-hydroxy-5-androsten-3-one;

(d) 17α-methylnortestosterone acetate in tertiary butyl alcohol in the presence of potassium tertiary butoxide with butyl bromide yielded 4,4-dibutyl-17α-methyl-17β-hydroxy-5-estren-3-one;

(e) 17α-ethylnortestosterone propionate in tertiary butyl alcohol in the presence of potassium tertiary butoxide with isobutyl iodide yielded 4,4-diisobutyl-17α-ethyl-17β-hydroxy-5-estren-3-one;

(f) 17α-propylnortestosterone hexanoate in tertiary butyl alcohol in the presence of potassium tertiary butoxide with allyl iodide yielded 4,4-diallyl-17α-propyl-17β-hydroxy-5-estren-3-one;

(g) 17α-vinylnortestosterone acetate in tertiary butyl alcohol in the presence of potassium tertiary butoxide with methyl iodide yielded 4,4-dimethyl-17α-vinyl-17β-hydroxy-5-estren-3-one.

Example 15.—4,4-dimethyl-17β-hydroxy-5-androsten-3-one 17β-acetate

To a solution of one milliliter of pyridine and one milliliter of acetic anhydride was added 200 milligrams of 4,4-dimethyl-17β-hydroxy-5-androsten-3-one and the mixture was heated at a temperature of 45 degrees for a period of five hours. Thereafter the reaction mixture was poured into ten milliliters of ice and water and the thus-obtained precipitate was recovered by filtration. The precipitate was thereupon recrystallized from methanol to give 4,4-dimethyl-17β-hydroxy-5-androsten-3-one 17β-acetate of melting point 145 to 150 degrees centigrade, rotation [α]$_D$ minus 29 degrees (chloroform).

*Anal.*—Calcd. for C$_{23}$H$_{34}$O$_3$: C, 77.05; H, 9.56. Found: C, 77.62; H, 9.30.

*Example 16.—4,4-dimethyl-17β-hydroxy-5-androsten-3-one 17β-propionate*

In the same manner as given in Example 15, 4,4-dimethyl-17β-hydroxy-5-androsten-3-one was reacted with a mixture of pyridine and propionic anhydride to give 4,4-dimethyl-17β-hydroxy-5-androsten-3-one 17β - propionate.

*Example 17.—4,4-dimethyl-17β-hydroxy-5-androsten-3-one 17β-butyrate*

In the same manner as given in Example 15, 4,4-dimethyl-17β-hydroxy-5-androsten-3-one was reacted with butyric anhydride to give 4,4-dimethyl-17β-hydroxy-5-androsten-3-one 17β-butyrate.

*Example 18.—4,4-dimethyl-17β-hydroxy-5-androsten-3-one 17β-benzoate*

In the same manner as given in Example 15, 4,4-dimethyl-17β-hydroxy-5-androsten-3-one was reacted in a mixture of pyridine and benzoyl chloride to give 4,4-dimethyl-17β-hydroxy-5-androsten-3-one 17β-benzoate.

*Example 19.—4,4-dimethyl-17β-hydroxy-5-androsten-3-one 17β-(β-cyclopentylpropionate)*

In the same manner as shown in Example 15, reacting 4,4-dimethyl-17β-hydroxy-5-androsten-3-one, dissolved in pyridine, with cyclopentylpropionyl bromide produces 4,4-dimethyl-17β-hydroxy-5-androsten-3-one 17β-(β-cyclopentylpropionate).

*Example 20.—4,4-diethyl-17β-hydroxy-5-androsten-3-one 17β-valerate*

In the same manner as shown in Example 15, 4,4-diethyl-17β-hydroxy-5-androsten-3-one was reacted in pyridine with valeric anhydride to give 4,4-diethyl-17β-hydroxy-5-androsten-3-one 17β-valerate.

*Example 21.—4,4-dipropyl-17β-hydroxy-5-androsten-3-one 17β-hexanoate*

In the same manner as shown in Example 15, 4,4-dipropyl-17β-hydroxy-5-androsten-3-one was reacted with hexanoyl bromide in pyridine solution to give 4,4-dipropyl-17β-hydroxy-5-androsten-3-one 17β-hexanoate.

*Example 22.—4,4-dimethyl-17β-hydroxy-5-estren-3-one 17-acetate*

A mixture was prepared containing 0.4 gram of 4,4-dimethyl-17β-hydroxy-5-estren-3-one, three milliliters of pyridine and three milliliters of acetic anhydride. This mixture was allowed to stand at room temperature at about 25 degrees centigrade for a period of sixteen hours and was thereafter poured into 25 milliliters of ice water and filtered. The thus-obtained precipitate was recrystallized from petroleum ether to yield 0.33 gram of 4,4-dimethyl-17β-hydroxy-5-estren-3-one 17β-acetate of melting point 125 to 129 degrees centigrade and rotation [α]$_D$ minus eight degrees (chloroform).

*Anal.*—Calcd. for C$_{22}$H$_{32}$O$_3$: C, 76.70; H, 9.36. Found: C, 77.13; H, 9.95.

*Example 23.—4,4-dimethyl-17β-hydroxy-5-estren-3-one 17β-propionate*

In the same manner as shown in Example 22, reacting 4,4-dimethyl-17β-hydroxy-5-estren-3-one with propionic anhydride in pyridine yielded 4,4-dimethyl-17β-hydroxy-5-estren-3-one 17β-propionate.

*Example 24.—4,4-dimethyl-17β-hydroxy-5-estren-3-one 17β-benzoate*

In the same manner as shown in Example 22, 4,4-dimethyl-17β-hydroxy-5-estren-3-one was reacted with benzoyl chloride in pyridine solution to give 4,4-dimethyl-17β-hydroxy-5-estren-3-one 17β-benzoate.

*Example 25*

In the same manner given in Example 22, reacting in pyridine solution:

(a) 4,4-dimethyl-17β-hydroxy-5-estren-3-one with butyric anhydride yielded 4,4-dimethyl-17β-hydroxy-5-estren-3-one 17β-butyrate;

(b) 4,4-dimethyl-17β-hydroxy-5-estren-3-one with valeric anhydride yielded 4,4 - dimethyl - 17β - hydroxy-5-estren-3-one 17β-valerate;

(c) 4,4-dimethyl-17β-hydroxy-5-estren-3-one with hexanoyl chloride yielded 4,4 - dimethyl - 17β - hydroxy-5-estren-3-one 17β-hexanoate;

(d) 4,4-dimethyl-17β-hydroxy-5-estren-3-one with benzoyl chloride yielded 4,4-dimethyl-17β-hydroxy-5-estren-3-one 17β-benzoate;

(e) 4,4-dimethyl-17β-hydroxy - 5 - estren - 3 - one with phenylacetyl bromide yielded 4,4-dimethyl-17β-hydroxy-5-estren-3-one 17β-phenylacetate;

(f) 4,4-diethyl-17β-hydroxy-5-estren-3-one with acetic anhydride yielded 4,4-diethyl-17β-hydroxy-5-estren-3-one 17β-acetate;

(g) 4,4-diethyl-17β-hydroxy-5-estren-3-one with trimethylacetyl chloride yielded 4,4-diethyl-17β-hydroxy-5-estren-3-one 17β-trimethylacetate;

(h) 4,4-dipropyl-17β-hydroxy - 5 - estren - 3 - one with chloroacetyl chloride yielded 4,4-dipropyl-17β-hydroxy-5-estren-3-one 17β-chloroacetate;

(i) 4,4-dibutyl-17β-hydroxy-5-estren-3-one with heptanoyl bromide yielded 4,4-dibutyl-17β-hydroxy-5-estren-3-one 17β-heptanoate.

In the same manner as shown in Examples 15 through 25, other esters of 4,4-dialkyl-17β-hydroxy-5-androsten-3-one and 4,4-dialkyl-17β-hydroxy-5-estren-3-one are prepared by admixing the selected 4,4-dialkyl-17β-hydroxy-5-androsten-3-one or the selected 4,4-dialkyl-17β-hydroxy-5-estren-3-one, respectively, wherein the alkyl group may be methyl, ethyl, propyl, butyl, isobutyl, isopropyl, allyl, or the like, with an anhydride or halide of an organic carboxylic acid preferably of a hydrocarbon carboxylic acid in a solvent such as pyridine, benzene, ether, toluene, or the like, with pyridine preferred to give the corresponding 17β-esters such as the acetate, propionate, butyrate, isobutyrate, valerate, isovalerate, hexanoate, heptanoate, benzoate, phenylacetate, phenylpropionate, trimethylacetate, triethylacetate, β-cyclopentylpropionate, chloroacetate, bromoacetate, iodoacetate, fluoroacetate, trichloro- and trifluoroacetate, toluate, anisate, or the like.

*Example 26.—4,4,17α-trimethyl-17β-hydroxy-5-androsten-3-one 17β-acetate*

A solution of 4,4,17α-trimethyl-17β-hydroxy-5-androsten-3-one (0.2 gram) in two milliliters of acetic acid was refluxed for a period of four hours. Thereafter the reaction mixture was poured into water and the aqueous mixture was extracted with methylene chloride. The methylene chloride extracts were washed with water and thereupon evaporated to give a residue which was repeatedly recrystallized from ethylacetate-Skellysolve B hexanes to give pure 4,4,17α-trimethyl-17β-hydroxy-5-androsten-3-one 17β-acetate.

*Example 27.—4,4,17α-trimethyl-17β-hydroxy-5-androsten-3-one 17β-propionate*

In the same manner given in Example 26, 4,4,17α-trimethyl-17β-hydroxy-5-androsten-3-one was heated on the water bath in propionic anhydride for a period of six hours and thereupon poured into excess of ice water. The aqueous mixture was extracted with methylene chloride, the methylene chloride layer was washed, dried over anhydrous sodium sulfate, and evaporated to give a residue which was recrystallized from methyl alcohol to give 4,4,17α-trimethyl-17β-hydroxy-5-androsten-3-one 17β-propionate.

*Example 28.—4,4,17α-trimethyl-17β-hydroxy-5-androsten-3-one 17β-benzoate*

A solution of 0.5 gram of 4,4,17α-trimethyl-17β-hydroxy-5-androsten-3-one in two milliliters of benzoyl chloride was heated for six hours in a water bath. Thereafter the solution was poured into water, five drops of sulfuric acid were added and the mixture was again heated on the water bath for a period of one hour. The aqueous mixture was neutralized with sodium bicarbonate and thereupon extracted with chloroform, the chloroform solution washed with water, dried over anhydrous sodium sulfate and evaporated to give 4,4,17α-trimethyl-17β-hydroxy-5-androsten-3-one 17β-benzoate.

*Example 29.—4,4,17α-trimethyl-17β-hydroxy-5-estren-3-one 17β-acetate*

In the same manner as given in Example 26, refluxing with acetic anhydride 4,4,17α-trimethyl-17β-hydroxy-5-estren-3-one produces 4,4,17α-trimethyl-17β-hydroxy-5-estren-3-one 17β-acetate.

*Example 30.—4,4,17α-triethyl-17β-hydroxy-5-estren-3-one-17β-butyrate*

In the same maner as given in Example 26, heating on the water bath 4,4,17α-triethyl-17β-hydroxy-5-androsten-3-one with butyric anhydride for a period of eight hours produces the corresponding 4,4,17α-triethyl-17β-hydroxy-5-estren-3-one 17β-butyrate.

*Example 31.—4,4,17α-tripropyl-17β-hydroxy-5-estrene-3-one phenylacetate*

A solution of 4,4,17α-tripropyl-17β-hydroxy-5-estren-3-one was heated with phenylacetyl bromide for a period of twelve hours in a water bath. The reaction mixture thus obtained contained both the 17β-phenylacetate of 4,4,17α-tripropyl-17β-hydroxy-5-androsten-3-one and the corresponding 3-enol ester thereof. The thus-obtained mixture was therefore hydrolyzed in an acidified aqueous solution as described in Example 28 to give 4,4,17α-tripropyl-17β-hydroxy-5-estren-3-one 17β-phenylacetate.

Other esters of 4,4,17α-trialkyl-17β-hydroxy-5-androsten-3-one and 4,4,17α-trialkyl-17β-hydroxy-5-estren-3-one are produced by either heating the 4,4,17α-trialkyl-17β-hydroxy-5-androsten-3-one or 4,4,17α-trialkyl-17β-hydroxy-5-estren-3-one, respectively, with an available hydrocarbon carboxylic acid anhydride or by heating the before-mentioned steroids with a halide of a hydrocarbon carboxylic acid and in addition performing a hydrolysis to hydrolyze the 3-enol acylate group to the 3-keto group. It is preferable to dissolve the selected 4,4-alkylated steroid in the reagent itself, i. e., in the anhydride or halide of a hydrocarbon carboxylic acid without another basic or neutral solvent and also in the absence of any acidic catalyst. The temperature of the reaction is usually between about sixty degrees centigrade and the reflux temperature of the acid anhydride or halide.

Esters of 4,4,17α-trialkyl-17β-hydroxy-5-androsten-3-one and 4,4,17α-trialkyl-17β-hydroxy-5-estren-3-ones thus produced containing from one to four carbon atoms, inclusive, in the alkyl group comprise: the acetate, propionate, butyrate, isobutyrate, valerate, isovalerate, hexanoate, heptanoate, octanoate, benzoate, phenylacetate, phenylpropionate, toluate, anisate, trimethylacetate, diethylacetate, chloroacetate, bromoacetate, fluoroacetate, iodoacetate, trichloro- and trifluoroacetate, or the like.

It is to be understood that the invention is not to be limited to the exact details of operation or exact compounds shown and described as obvious modifications and equivalents will be apparent to one skilled in the art, and the invention is therefore to be limited only by the scope of the appended claims.

We claim:

1. A 3-keto-4,4,dialkyl-17-oxygenated-Δ⁵-steroid of the formula

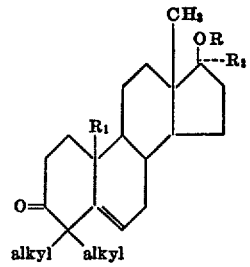

wherein $R_1$ is selected from the group consisting of hydrogen and methyl, $R_2$ is selected from the group consisting of hydrogen, methyl, ethyl, propyl and vinyl, R is selected from the group consisting of hydrogen and the acyl radical of a hydrocarbon carboxylic acid containing from one to eight carbon atoms, inclusive, and wherein the alkyl groups contain between one and four carbon atoms, inclusive.

2. 4,4,-dialkyl-17β-hydroxy-5-androsten-3-one wherein the alkyl group contains from one to four carbon atoms, inclusive.

3. 4,4-dimethyl-17β-hydroxy-5-androsten-3-one.

4. 4,4-dialkyl-17β-hydroxy-5-estren-3-one wherein the alkyl group contains from one to four carbon atoms, inclusive.

5. 4,4-dimethyl-17β-hydroxy-5-estren-3-one.

6. 4,4-dialkyl-17β-acyloxy-5-androsten-3-one wherein the alkyl group contains from one to four carbon atoms, inclusive, and wherein the acyl group is of a hydrocarbon carboxylic acid containing from one to eight carbon atoms, inclusive.

7. 4,4-dimethyl-17β-acetoxy-5-androsten-3-one.

8. 4,4-dialkyl-17β-acyloxy-5-estren-3-one wherein the alkyl group contains from one to four carbon atoms, inclusive, and wherein the acyl group is of a hydrocarbon carboxylic acid containing from one to eight carbon atoms, inclusive.

9. 4,4-dimethyl-17β-acetoxy-5-estren-3-one.

10. 4,4,17α-trimethyl-17β-hydroxy-5-androsten-3-one.

11. 4,4,17α-trialkyl-17β-hydroxy-5-estren-3-one wherein the alkyl group contains from one to four carbon atoms, inclusive.

12. A process which comprises: reacting a 3-keto-17-oxygenated-Δ⁴-steroid of the formula

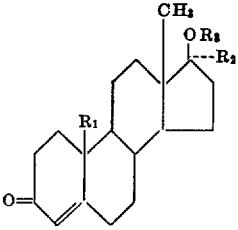

wherein $R_1$ is selected from the group consisting of hydrogen and methyl, $R_2$ is selected from the group consisting of hydrogen, methyl, ethyl, propyl and vinyl, and $R_3$ is selected from the group consisting of hydrogen and an acyl group of a hydrocarbon carboxylic acid containing from one to eight carbon atoms, inclusive, with an alkyl halide wherein the alkyl group contains from one to four carbon atoms and wherein the halogen is of atomic number 17 to 53, inclusive, in the presence of a strongly basic medium.

13. A process which comprises: reacting a 3-keto-17-oxygenated-Δ⁴-steroid of the formula

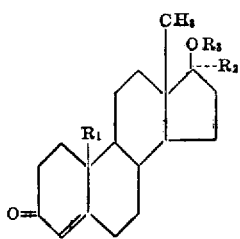

wherein $R_1$ is selected from the group consisting of hydrogen and methyl, $R_2$ is selected from the group consisting of hydrogen, methyl, ethyl, propyl and vinyl, and $R_3$ is selected from the group consisting of hydrogen and an acyl group of a hydrocarbon carboxylic acid containing from one to eight carbon atoms, inclusive, with an alkyl iodide wherein the alkyl group contains from one to four carbon atoms in the presence of an alkali metal alkoxide.

14. A process which comprises: reacting a 3-keto-17-oxygenated-Δ⁴-steroid of the formula

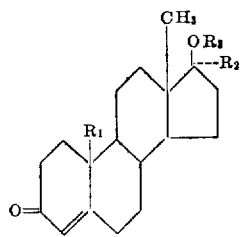

wherein $R_1$ is selected from the group consisting of hydrogen and methyl, $R_2$ is selected from the group consisting of hydrogen, methyl, ethyl, propyl and vinyl, and $R_3$ is selected from the group consisting of hydrogen and an acyl group of a hydrocarbon carboxylic acid containing from one to eight carbon atoms, inclusive, with methyl iodide in the presence of an alkali metal tertiary alkoxide.

15. A process for the production of 4,4-dimethyl-17β-hydroxy-5-androsten-3-one which comprises: reacting testosterone with methyl halide in the presence of an alkali metal tertiary alkoxide to obtain 4,4-dimethyl-17β-hydroxy-5-androsten-3-one.

16. A process for the production of 4,4-dimethyl-17β-hydroxy-5-estren-3-one which comprises: reacting nortestosterone with methyl halide in the presence of an alkali metal tertiary alkoxide to obtain 4,4-dimethyl-17β-hydroxy-5-estren-3-one.

17. A process for the production of 4,4-dimethyl-17β-acyloxy-5-androsten-3-one wherein the acyl group is of an organic carboxylic acid containing from one to eight carbon atoms, inclusive, which comprises: reacting testosterone with methyl halide in the presence of an alkali metal tertiary alkoxide to obtain 4,4-dimethyl-17β-hydroxy-5-androsten-3-one and esterifying with an acylating reagent selected from the group consisting of halides and anhydrides of organic carboxylic acids containing from one to eight carbon atoms, inclusive, to obtain 4,4-dimethyl-17β-acyloxy-5-androsten-3-one.

18. A process for the production of 4,4-dimethyl-17β-acetoxy-5-androsten-3-one which comprises: reacting testosterone with methyl iodide in the presence of an alkali-metal tertiary alkoxide to obtain 4,4-dimethyl-17β-hydroxy-5-androsten-3-one, and esterifying the thus-produced 4,4-dimethyl-17β-hydroxy-5-androsten-3-one with acetic anhydride to obtain 4,4-dimethyl-17β-acetoxy-5-androsten-3-one.

19. A process for the production of 4,4-dimethyl-17β-acyloxy-5-estren-3-one wherein the acyl group is of an organic carboxylic acid containing from one to eight carbon atoms which comprises: reacting nortestosterone with methyl halide in the presence of an alkali metal tertiary alkoxide to obtain 4,4-dimethyl-17β-hydroxy-5-estren-3-one and esterifying with an acylating reagent selected from the group consisting of halide and anhydrides of organic carboxylic acids containing from one to eight carbon atoms, inclusive, to obtain 4,4-dimethyl-17β-acyloxy-5-estren-3-one.

20. A process for the production of 4,4-dimethyl-17β-acetoxy-5-estren-3-one which comprises: reacting nortestosterone with methyl iodide in the presence of an alkali-metal tertiary alkoxide to obtain 4,4-dimethyl-17β-hydroxy-5-estren-3-one and esterifying the thus-produced 4,4-dimethyl-17β-hydroxy-5-estren-3-one with acetic anhydride to obtain 4,4-dimethyl-17β-acetoxy-5-estren-3-one.

21. A process for the production of 4,4,17α-trimethyl-17β-hydroxy-5-androstren-3-one which comprises: reacting methyltestosterone with methyl halide in the presence of an alkali-metal tertiary alkoxide to obtain 4,4,17α-trimethyl-17β-hydroxy-5-androsten-3-one.

No references cited.

Notice of Adverse Decision in Interference

In Interference No. 89,594 involving Patent No. 2,813,880, J A. Campbell and J. C. Babcock, 4,4-dialkyl androstenes and method, final judgment adverse to the patentees was rendered June 28, 1962, as to claims 2, 3, 6, 10, 15, 17 and 21.
[*Official Gazette October 16, 1962.*]